United States Patent
Chaiken et al.

(10) Patent No.: US 12,501,216 B2
(45) Date of Patent: Dec. 16, 2025

(54) MANAGING SPEAKER-INDUCED VIBRATION OF AN INFORMATION HANDLING SYSTEM

(71) Applicant: Dell Products L.P., Round Rock, TX (US)

(72) Inventors: Craig Lawrence Chaiken, Pflugerville, TX (US); Shiven Hiteshbhai Pandya, Austin, TX (US); Jack Nazarian, Tarzana, CA (US)

(73) Assignee: Dell Products L.P., Round Rock, TX (US)

( * ) Notice: Subject to any disclaimer, the term of this patent is extended or adjusted under 35 U.S.C. 154(b) by 197 days.

(21) Appl. No.: 18/530,560

(22) Filed: Dec. 6, 2023

(65) Prior Publication Data

US 2025/0193593 A1   Jun. 12, 2025

(51) Int. Cl.
*H04R 3/04*   (2006.01)
*G10L 21/0216*   (2013.01)
*G10L 25/51*   (2013.01)

(52) U.S. Cl.
CPC .......... *H04R 3/04* (2013.01); *G10L 21/0216* (2013.01); *G10L 25/51* (2013.01); *G10L 2021/02163* (2013.01)

(58) Field of Classification Search
None
See application file for complete search history.

(56) References Cited

U.S. PATENT DOCUMENTS

| | | | |
|---|---|---|---|
| 9,560,456 B2 * | 1/2017 | Banba | H04R 25/30 |
| 9,621,988 B2 * | 4/2017 | McKenzie | G11B 5/59694 |
| 11,948,593 B2 * | 4/2024 | Du | G10L 15/22 |

* cited by examiner

*Primary Examiner* — Paul W Huber
(74) *Attorney, Agent, or Firm* — McDermott Will & Schulte LLP

(57) ABSTRACT

Managing speaker-induced vibration of an information handling system, including generating, based on an audio signal, an audio output at speakers; recording, by a microphone and concurrently with generating the audio output at the speakers, the audio output of the speakers to define a recorded audio signal; normalizing the recorded audio signal to define a normalized recorded audio signal; filtering the normalized recorded audio signal to remove frequencies corresponding to the generated audio signal to define a filtered normalized recorded audio signal; extracting, based on the filtering, a noise signal from the filtered normalized recorded audio signal; determining that the noise signal is correlated with the generated audio signal; determining that a ratio of an amplitude of the noise signal to an amplitude of the normalized recorded audio signal is above a threshold; and detecting a speaker-induced vibration of the information handling system.

20 Claims, 16 Drawing Sheets

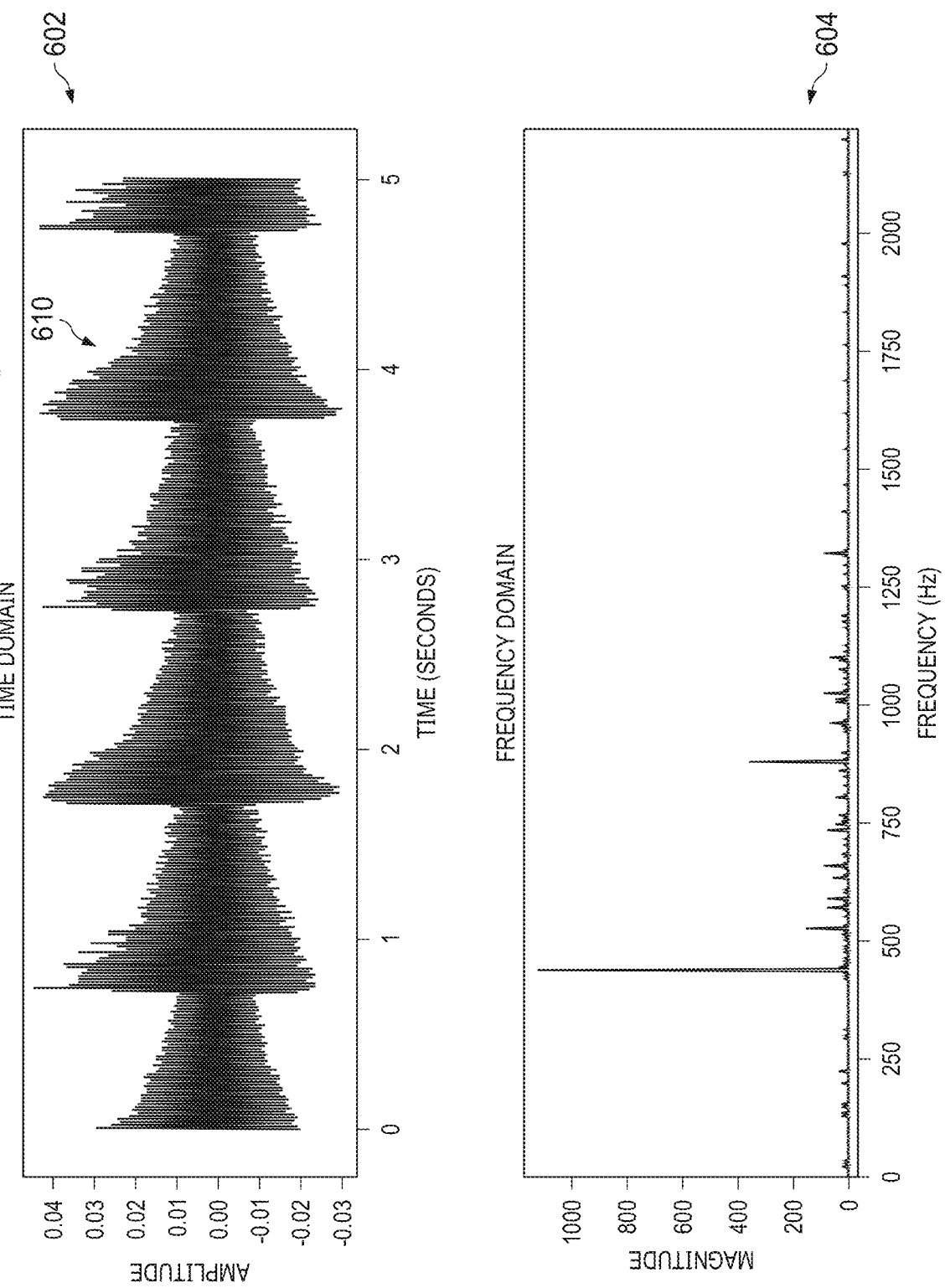

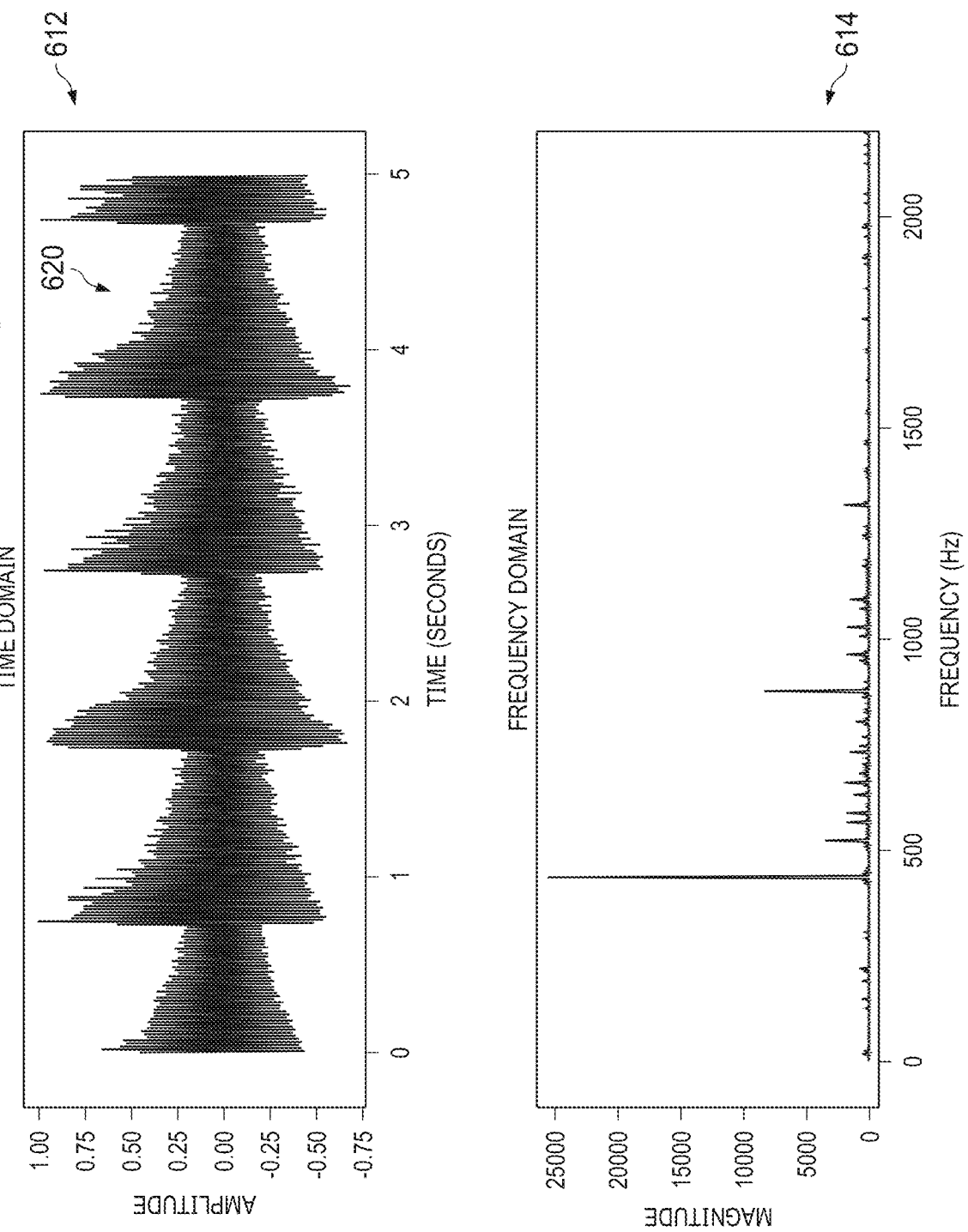

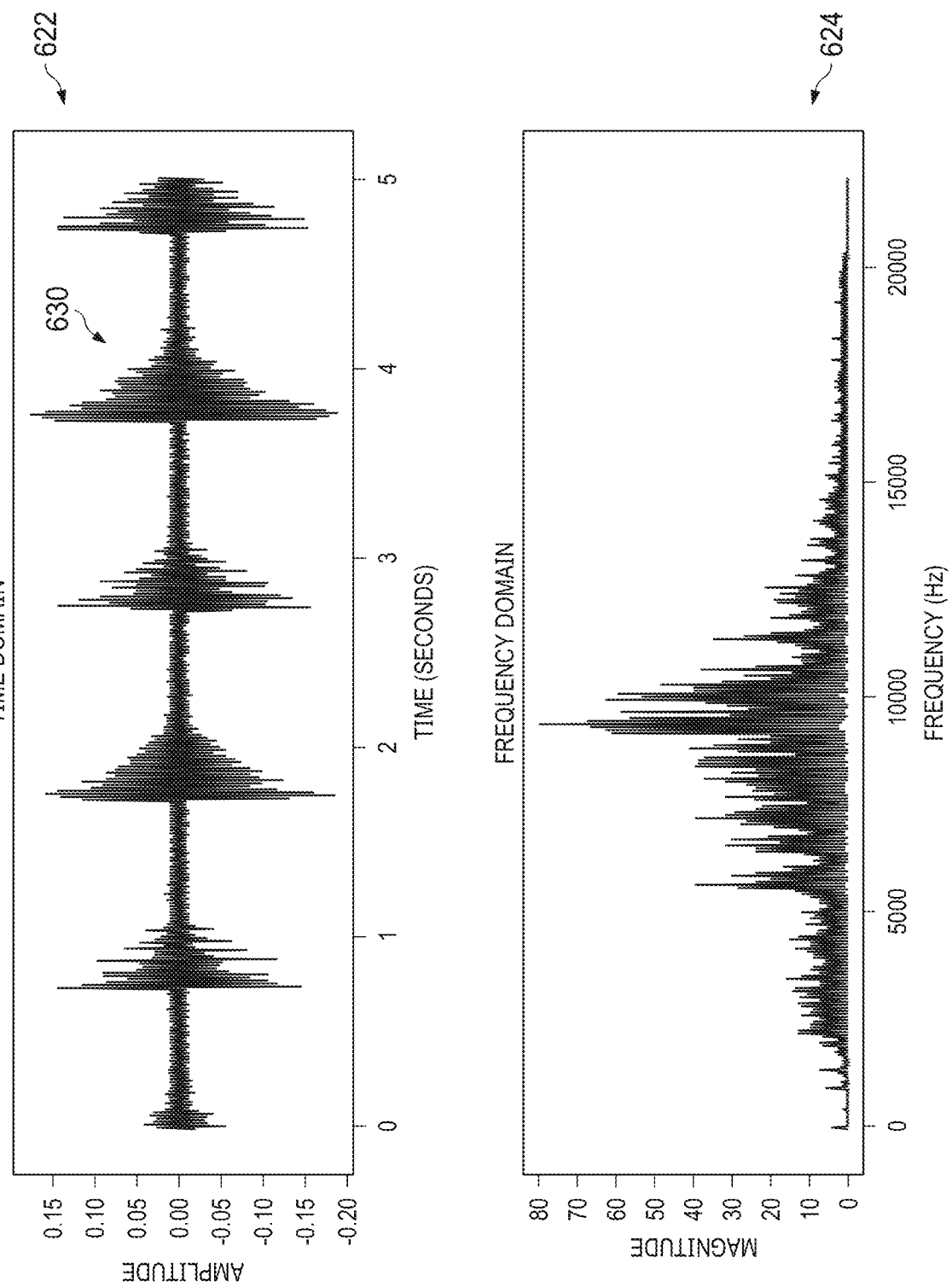

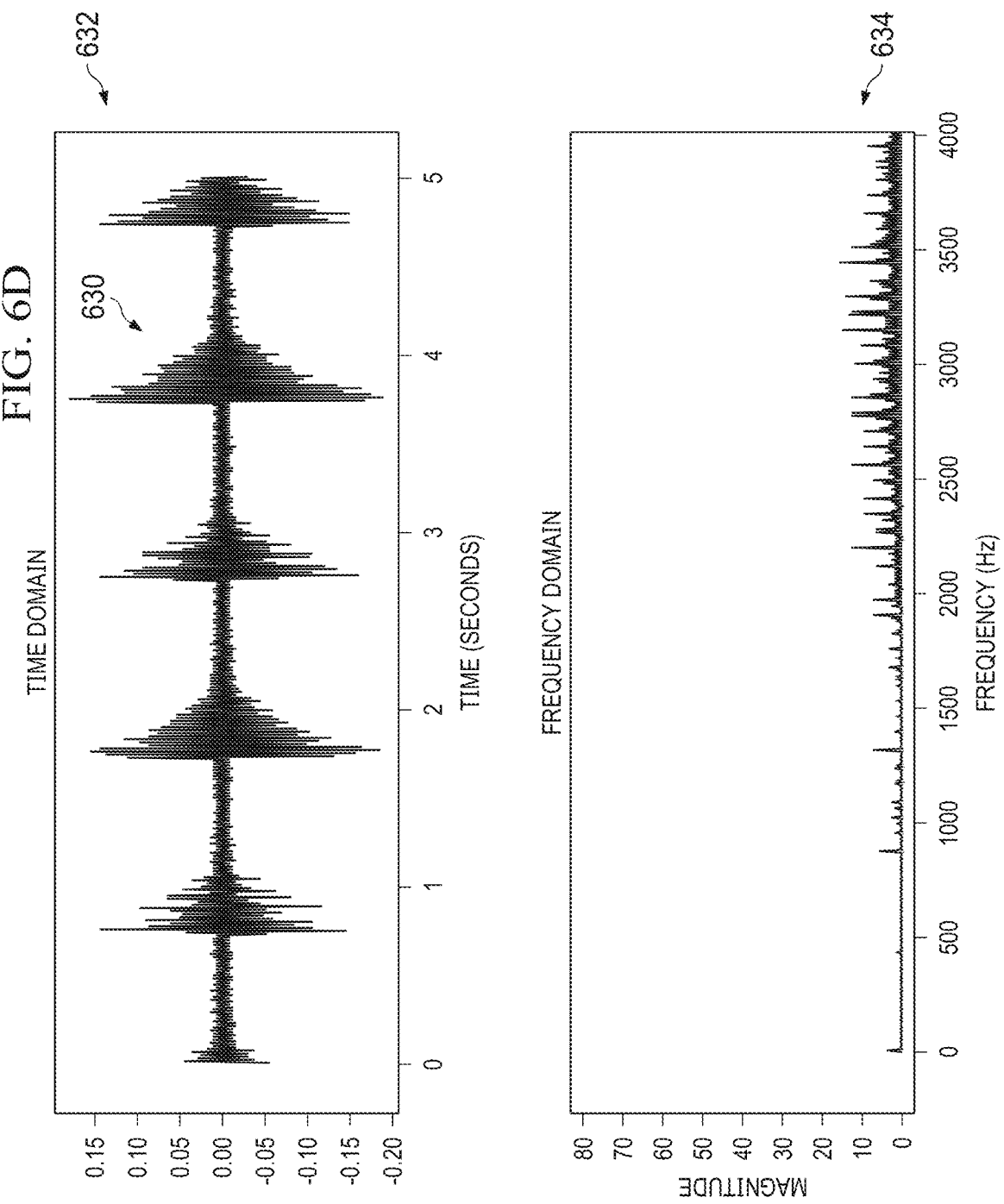

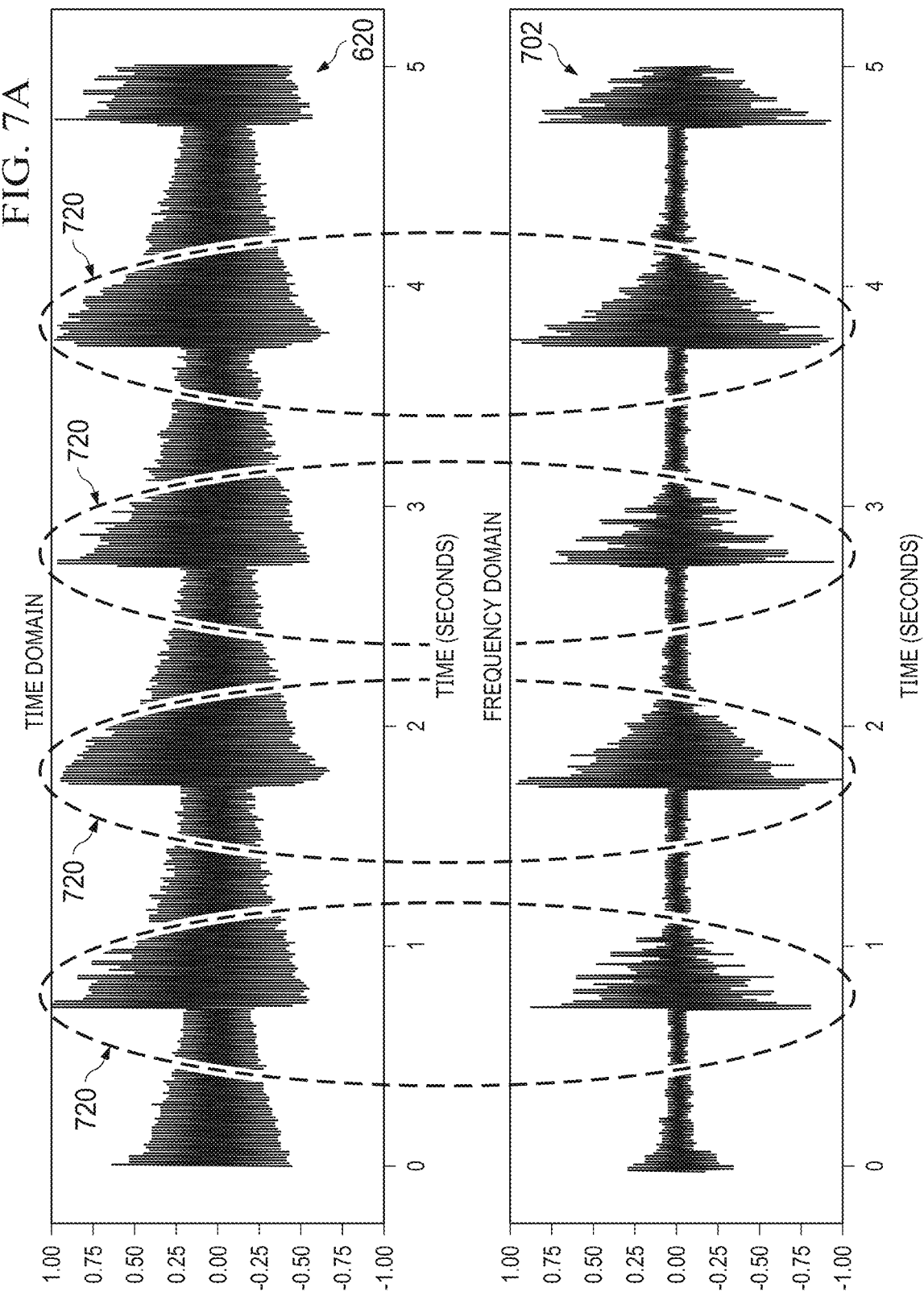

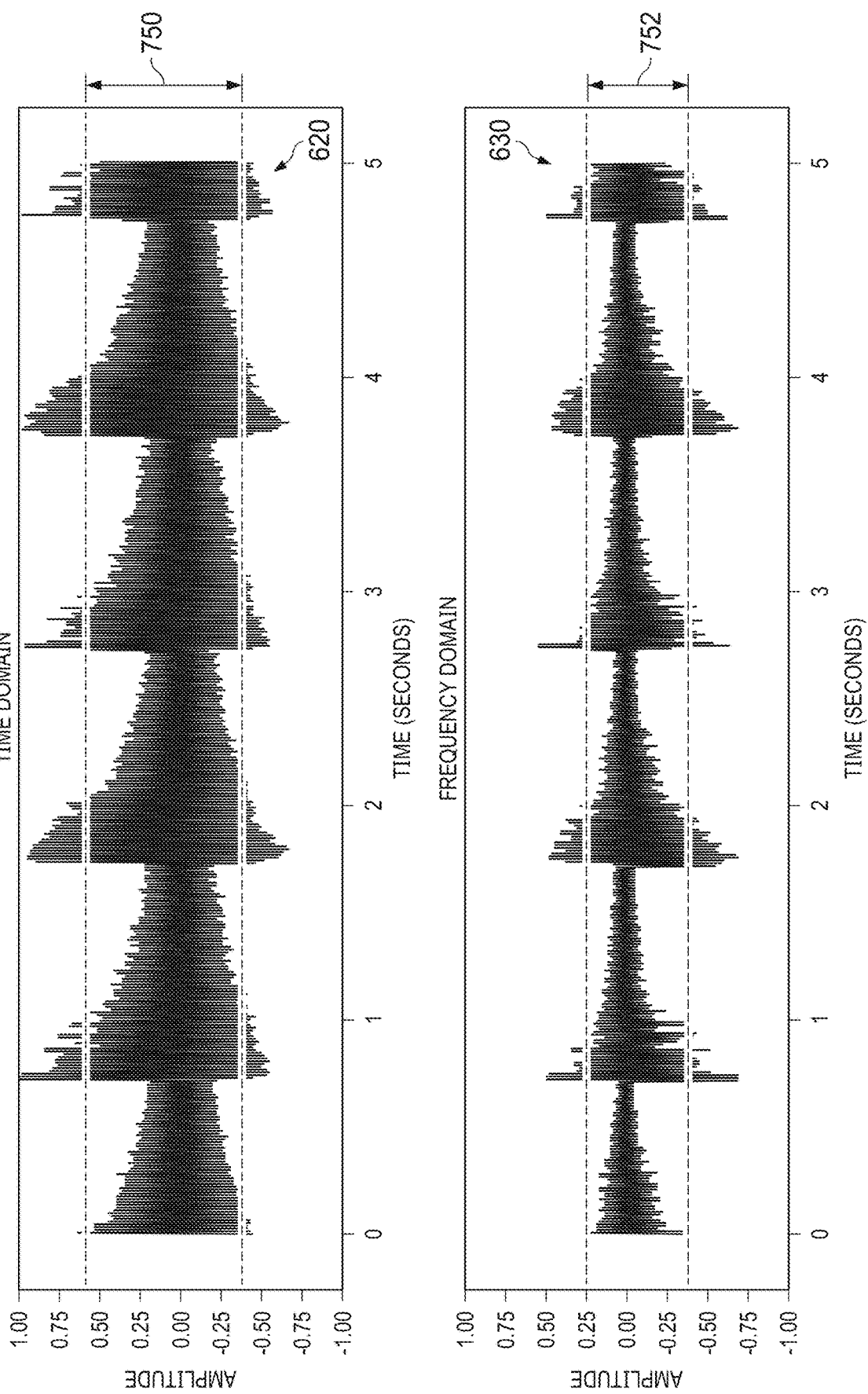

MANAGING SPEAKER-INDUCED VIBRATION OF AN INFORMATION HANDLING SYSTEM

BACKGROUND

Field of the Disclosure

The disclosure relates generally to an information handling system, and in particular, managing speaker-induced vibration of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An internal laptop speaker can rattle when it plays certain sounds if it is lightly touching the chassis of a laptop. This causes the chassis to vibrate, resulting in objectionably distorted audio (e.g., during video teleconferencing applications).

SUMMARY

Innovative aspects of the subject matter described in this specification may be embodied in a method of managing speaker-induced vibration of an information handling system, including generating an audio signal; generating, based on the audio signal, an audio output at speakers of the information handling system; recording, by a microphone of the information handling system and concurrently with generating the audio output at the speakers, the audio output of the speakers to define a recorded audio signal; normalizing the recorded audio signal to define a normalized recorded audio signal; filtering the normalized recorded audio signal to remove frequencies corresponding to the generated audio signal to define a filtered normalized recorded audio signal; extracting, based on the filtering, a noise signal from the filtered normalized recorded audio signal; determining that the noise signal is correlated with the generated audio signal; in response to determining that the noise signal is correlated with the generated audio signal, determining that a ratio of an amplitude of the noise signal to an amplitude of the normalized recorded audio signal is above a threshold; and in response to determining that the ratio of the amplitude of the noise signal to the amplitude of the normalized recorded audio signal is above the threshold, detecting a speaker-induced vibration of the information handling system.

Other embodiments of these aspects include corresponding systems, apparatus, and computer programs, configured to perform the actions of the methods, encoded on computer storage devices.

These and other embodiments may each optionally include one or more of the following features. For instance, in response to detecting the speaker-induced vibration of the information handling system, providing a notification at the information handling system indicating the speaker-induced vibration. Generating the audio signal further includes generating a first audio portion, the first audio portion including i) frequencies of a first range and ii) amplitude attenuation over a time period of the first audio portion; generating a second audio portion, the second audio portion including i) frequencies of a second range greater than the first range and ii) amplitude attention over a time period of the second audio portion; combining the first audio portion and the second audio portion sequentially to defined a combined audio portion; and repeating the combined audio portion two or more times to define the generated audio signal. Retrieving identifying information of the information handling system; and generating the audio signal based on the identifying information. Identifying information of the information handling system includes a service tag of the information handling system. The service tag includes a plurality of symbols, where each symbol of the plurality of symbols is translated into a corresponding audio portion. Combining the corresponding audio portions to generate the audio signal.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 6A-6D illustrate visualizations of the generated audio signal, in the first embodiment.

FIGS. 7A-7B illustrate comparisons of a noise signal and the generated audio signal.

DESCRIPTION OF PARTICULAR EMBODIMENT(S)

Figure 1:
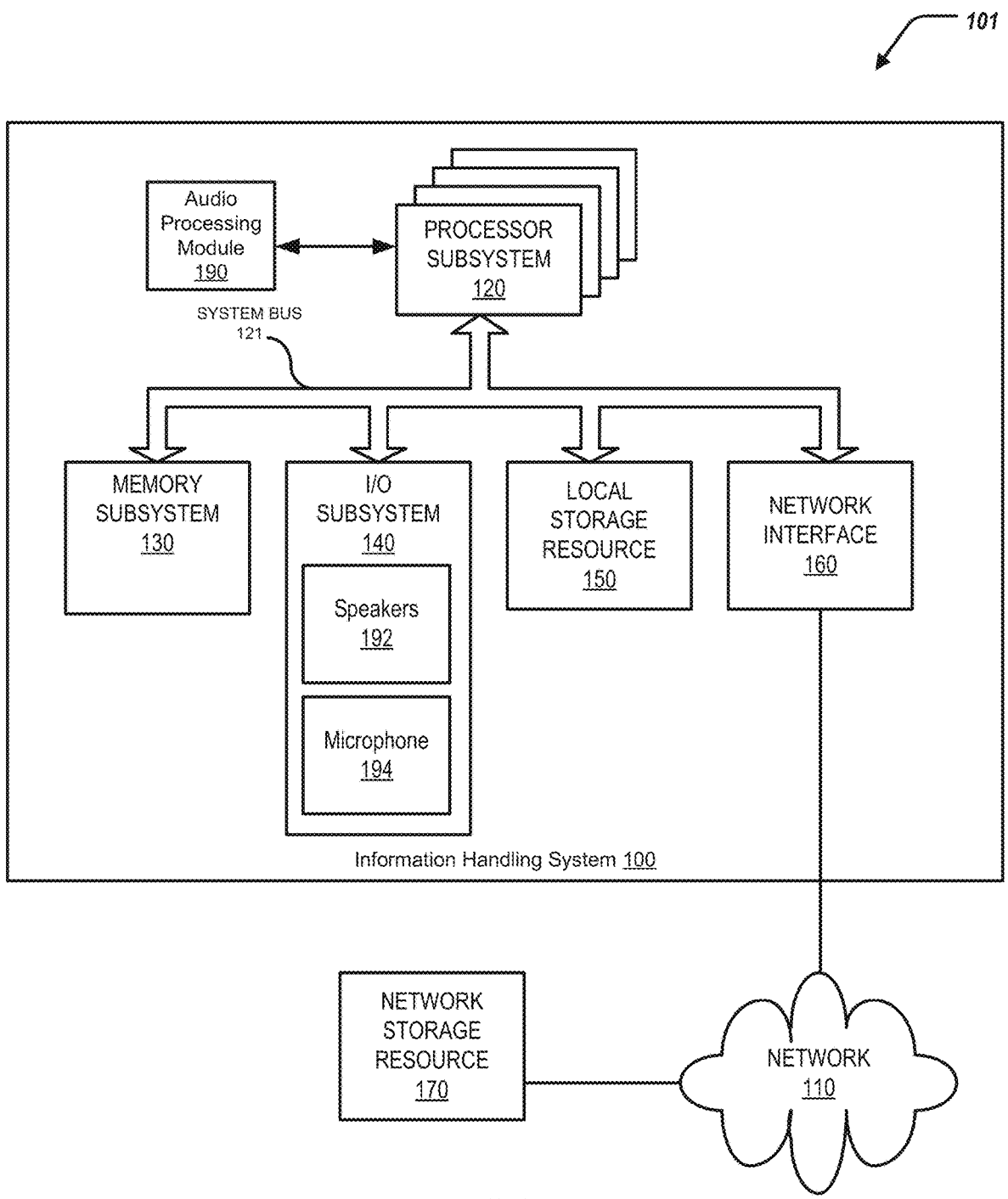
FIG. 1 is a block diagram of selected elements of an embodiment of an information handling system.

This disclosure discusses methods and systems for managing speaker-induced vibration of an information handling system. In short, speakers of the information handling system can provide a speaker-induced vibration of the information handling system. For example, the speakers can be in contact with a surface of the information handling system such that when the speakers are producing sound, the speakers further vibrate the information handling system, producing a "rattling" sound, that is undesirable. To that end, such a "rattling" sound can be detected by microphone(s), and a notification can be provided that the information handling system suffers from such a "rattling" sound and compensation efforts can be made (e.g., the information handling system can be serviced). For example, during manufacture and testing of the information handling system, such a "rattling" sound can be detected prior to shipment of the information handling system to a client. Adjustments can be made to the speaker, placement of the speaker and surrounding components, as well as other mitigation efforts can be undertaken in view of detection of such "rattling" sound.

Specifically, this disclosure discusses a system and a method for managing speaker-induced vibration of an information handling system, the method including generating an audio signal; generating, based on the audio signal, an audio output at speakers of the information handling system; recording, by a microphone of the information handling system and concurrently with generating the audio output at the speakers, the audio output of the speakers to define a recorded audio signal; normalizing the recorded audio signal to define a normalized recorded audio signal; filtering the normalized recorded audio signal to remove frequencies corresponding to the generated audio signal to define a filtered normalized recorded audio signal; extracting, based on the filtering, a noise signal from the filtered normalized recorded audio signal; determining that the noise signal is correlated with the generated audio signal; in response to determining that the noise signal is correlated with the generated audio signal, determining that a ratio of an amplitude of the noise signal to an amplitude of the normalized recorded audio signal is above a threshold; and in response to determining that the ratio of the amplitude of the noise signal to the amplitude of the normalized recorded audio signal is above the threshold, detecting a speaker-induced vibration of the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-10 wherein like numbers are used to indicate like and corresponding parts.

Turning now to the drawings, FIG. 1 illustrates a block diagram depicting selected elements of a computing environment 101 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. Specifically, the I/O subsystem 140 can include speakers 192 and a microphone (or microphones) 194.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an audio processing module 190. The audio processing module 190 can be in communication with the processor subsystem 120, or included by the processor subsystem 120. In some examples, the audio processing module 190 is included by an embedded controller (EC) of the information handling system 100.

In short, the speakers 192 can provide a speaker-induced vibration of the information handling system 202. For example, the speakers 192 can be in contact with a surface of the information handling system 202 such that when the speakers 192 are producing sound, the speakers 192 further vibrate the information handling system 202, producing a "rattling" sound, that is undesirable. To that end, such a "rattling" sound can be detected by the microphone(s) 194, and a notification can be provided that the information handling system 202 suffers from such a "rattling" sound and compensation efforts can be made (e.g., the information handling system 202 can be serviced), explained further herein.

Figure 2:
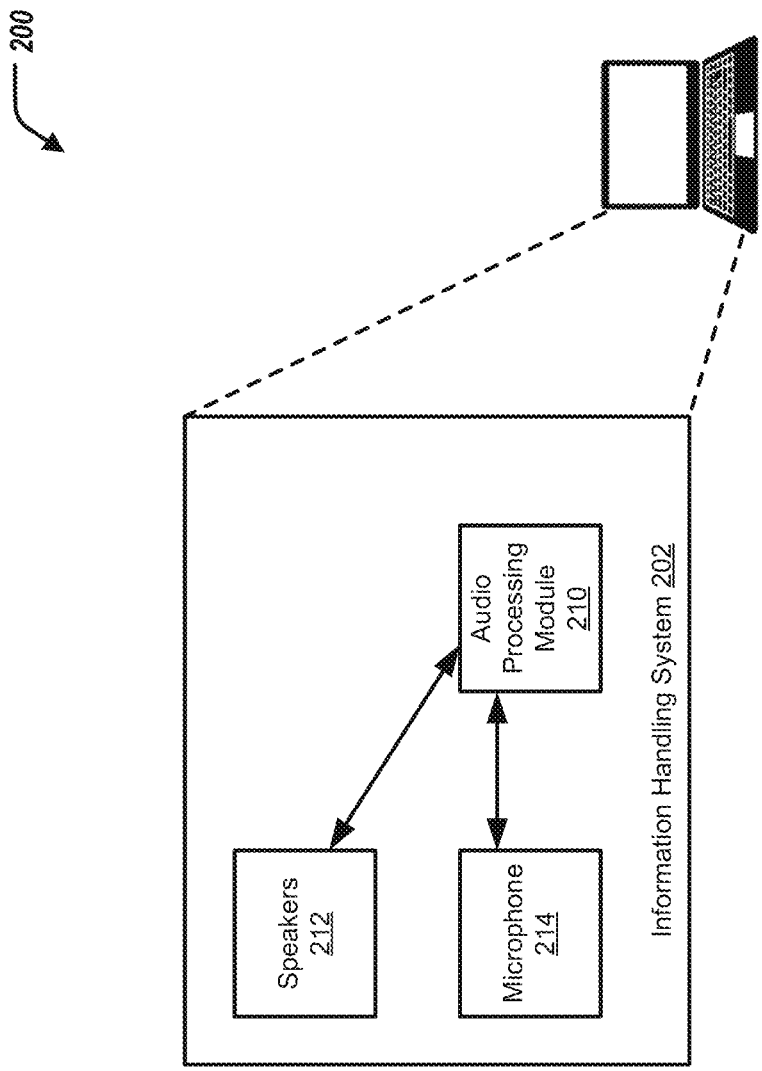
FIG. 2 illustrates a block diagram of an information handling system for managing speaker-induced vibration of the information handling system.

Turning to FIG. 2, FIG. 2 illustrates an environment 200 including an information handling system 202. The information handling system 202 can include an audio processing module 210, speakers 212, and a microphone (or microphones) 214. In some examples, the information handling system 202 is similar to, or includes, the information handling system 100 of FIG. 1. In some examples, the audio processing module 210 is the same, or substantially the same, as the audio processing module 190 of FIG. 1. In some examples, the speakers 212 are the same, or substantially the same, as the speakers 192 of FIG. 1. In some examples, the microphone 214 is the same, or substantially the same, as the microphone 214 of FIG. 1.

The audio processing module 210 can be in communication with the speakers 212 and the microphone 214.

Figure 3:
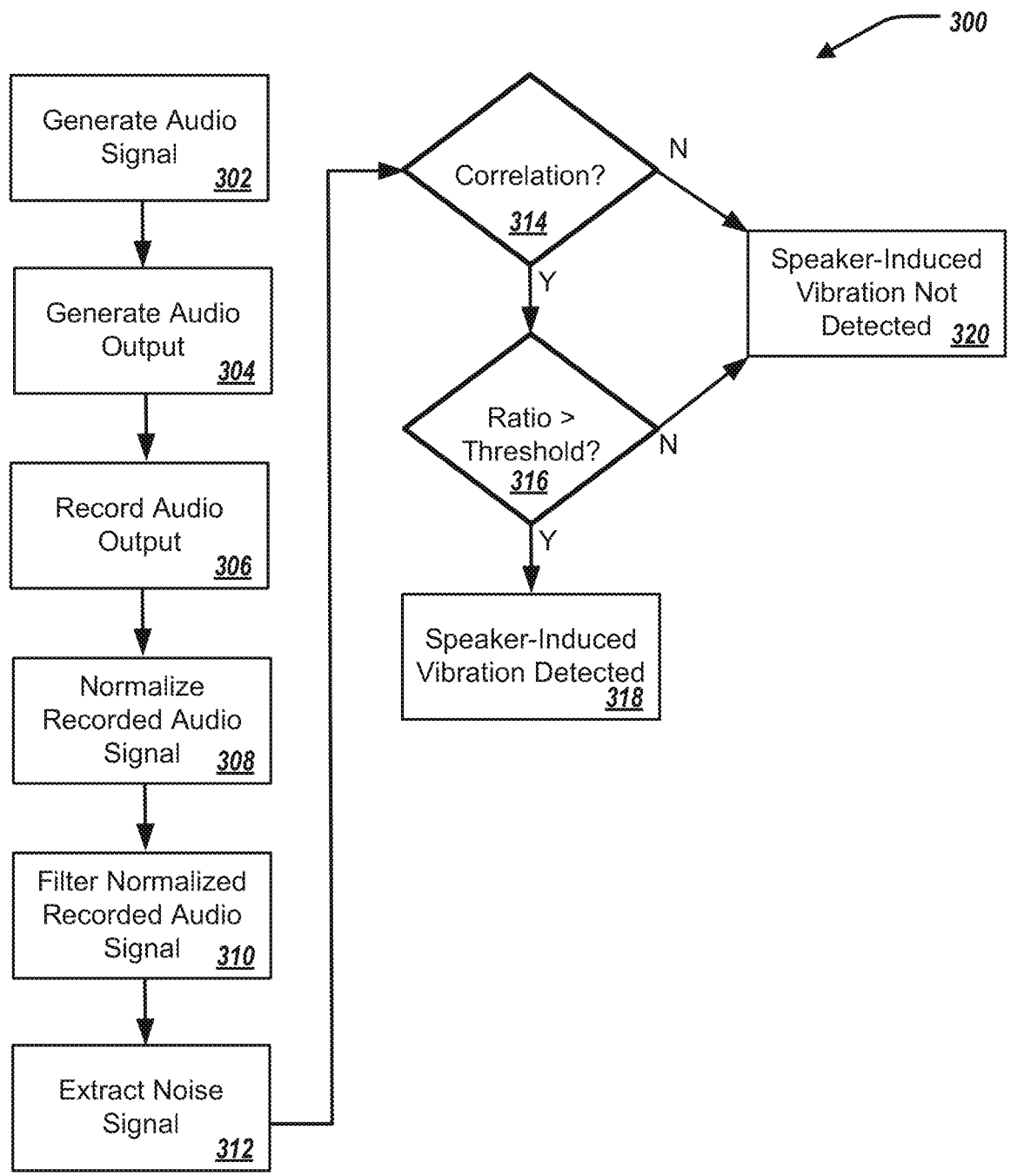
FIG. 3 illustrates a method for managing speaker-induced vibration of the information handling system, in a first embodiment.

FIG. 3 illustrates a flowchart depicting selected elements of an embodiment of a method 300 for managing speaker-induced vibration of the information handling system 202. The method 300 may be performed by the information handling system 100, the information handling system 202, and/or the audio processing module 210, and with reference to FIGS. 1-2 and 4-7. It is noted that certain operations described in method 300 may be optional or may be rearranged in different embodiments.

Figure 4:
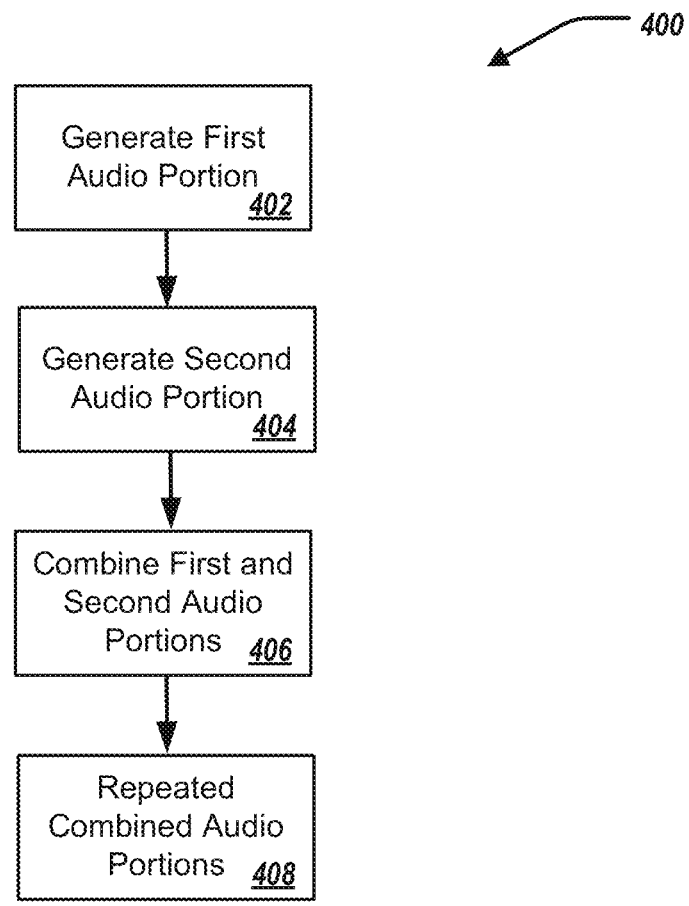
FIG. 4 illustrates a method for generating an audio signal, in the first embodiment.
Figure 5A:
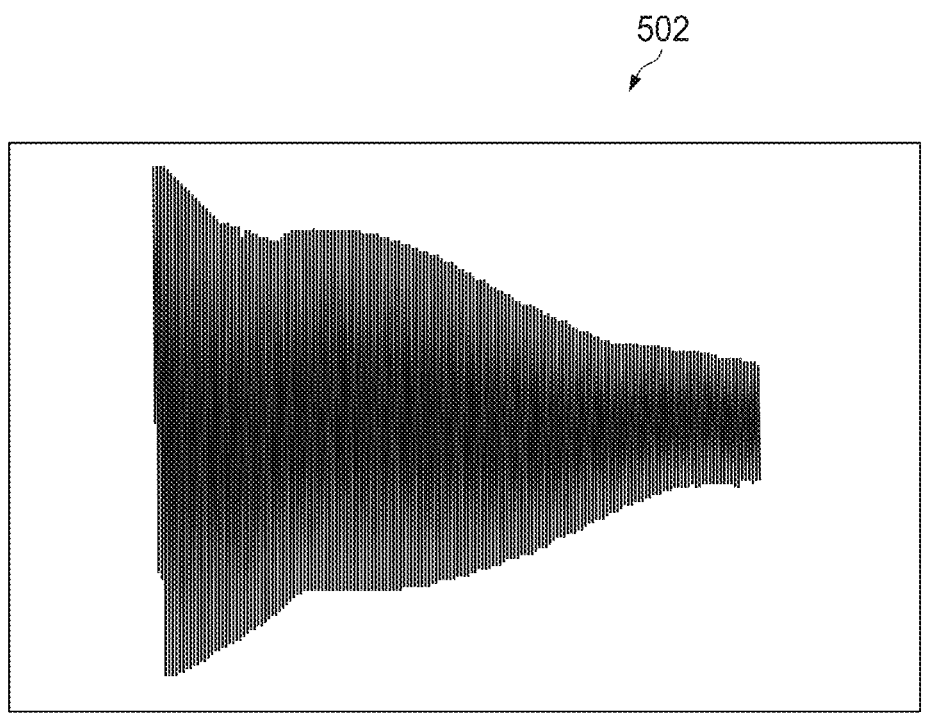
FIGS. 5A-5D illustrate segments of the generated audio signal, in the first embodiment.

The audio processing module 210 can generate an audio signal, at 302. In some examples, generating the audio signal can include generating an audio signal with lower frequencies to gather vibration data and higher frequencies for system resonance. FIG. 4 illustrates a flowchart depicting selected elements of generating the audio signal, in a first implementation. Specifically, the audio processing module 210 generates a first audio portion, at 402. The first audio portion can include frequencies of a first range. For example, the first range can include "low range" frequencies such as 20 Hz to 200 Hz. These frequencies can induce (diaphragm) vibration at the speakers 212. Further, the first audio portion can include amplitude attenuation over a time period of the first audio portion. Attenuating the amplitude of the first audio portion can facilitate creating a pattern in the time domain. FIG. 5A illustrates an example of the first audio portion 502.

Figure 5B:
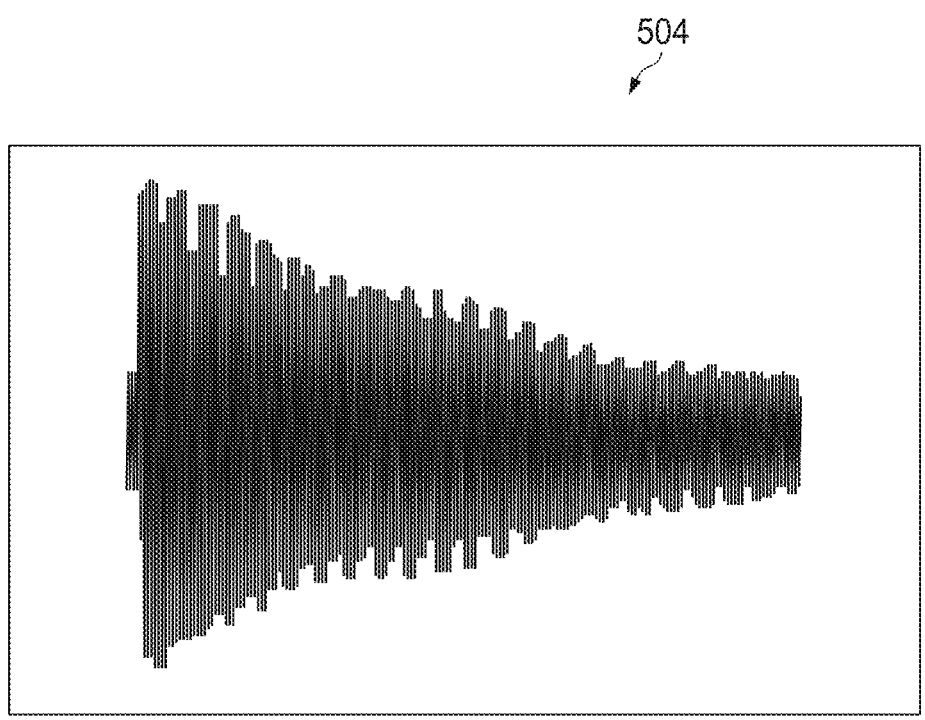

The audio processing module 210 can generate a second audio portion, at 404. The second audio portion can include frequencies of a second range that are greater than the first range. For example, the second range can include "midrange" frequencies such as 200 Hz to 1 kHz. These frequencies can facilitate generating resonance at the speakers 212. Further, the second audio portion can include amplitude attenuation over a time period of the second audio portion. Attenuating the amplitude of the second audio portion can facilitate creating a pattern in the time domain. FIG. 5B illustrates an example of the second audio portion 504.

Figure 5C:
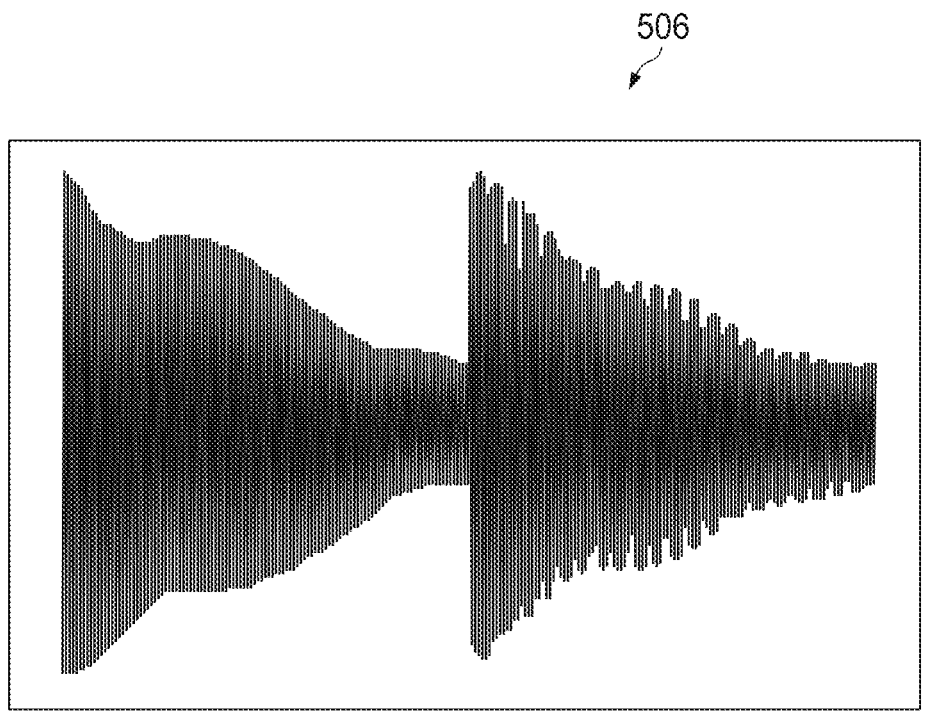
Figure 5D:
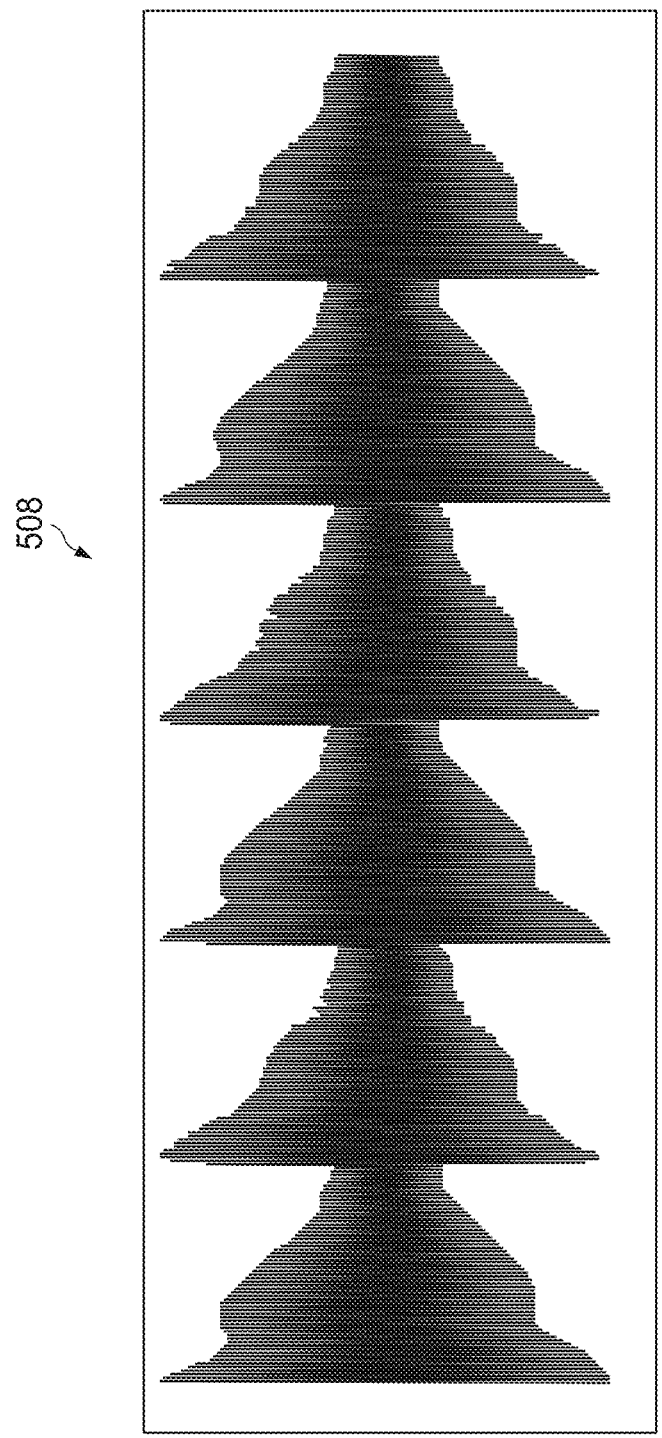

The audio processing module 210 can combine the first audio portion 502 and the second audio portion 504, at 406. Specifically, the audio processing module 210 can combine the first audio portion 502 and the second audio portion 504 sequentially to find a combined audio portion 506, as shown in FIG. 5C. In some examples, the audio processing module 210 can combine the first audio portion 502 and the second audio portion 504 sequentially such that the first audio portion 502 occurs first and the second audio portion 504 occurs second in the combined audio portion 506.

The audio processing module 210 can repeat the combined audio portion 506 two or more times to define the generated audio signal, at 408. For example, the generated audio signal can include multiple repetitions of the combined audio portion 506, shown as the generated audio signal 508 of FIG. 5D. As illustrated, the generated audio signal 508 includes three repetitions of the combined audio portion 506; however, the generated audio signal 508 can include any number of repetitions of the combined audio portion 506.

Returning to FIG. 3, the audio processing module 210 can generate, based on the generated audio signal, an audio output at the speakers 212, at 304. These speakers 212 can "play" the generated audio signal—i.e., generate sound that is reflective of the generated audio signal. The microphone 214 can record the audio output of the speakers 212, at 306. Specifically, the microphone 214 can record all sounds proximate to the microphone 214, including any environmental sounds and sounds generated by the speakers 212. The microphone 214 can record the audio output of the speakers 212 to define a recorded audio signal. The microphone 214 can record the audio output of the speakers 212 to define the recorded audio signal concurrently with the speakers 212 outputting the generated audio signal. That is, the microphone 214 can record the audio output of the speakers 212 concurrently, or substantially concurrently, or simultaneously, or substantially simultaneously, with the speakers 212 outputting the generated audio signal (the speakers 212 "playing" the audio signal). FIG. 6A depicts the recorded audio signal 610 in the time domain, at 602; and in the frequency domain, at 604.

The audio processing module 210 normalizes the recorded audio signal, at 308. Specifically, the audio processing module 210 normalizes the recorded audio signal to define a normalized recorded audio signal. The audio processing module 210 normalizes the recorded audio signal by scaling the amplitude of the recorded audio signal to a standard level—e.g., such that it is within the range of −1 to 1. FIG. 6B depicts the normalized recorded audio signal 620 in the time domain, at 612; and in the frequency domain, at 614.

The audio processing module 210 filters the normalized recorded audio signal, at 310. Specifically, the audio processing module 210 filters the normalized recorded audio signal to remove frequencies corresponding to the generated audio signal to define a filtered normalized recorded audio signal. For example, the audio processing module 210 filters frequencies up to 1 kHz that correspond to frequencies of the generated audio signal.

The audio processing module 210 extracts, based on the filtering, a noise signal from the filtered normalized recorded audio signal, at 312. Specifically, the audio processing module 210 extracts the noise signal from the normalized recorded audio signal by filtering the frequencies that correspond to the generated audio signal. FIG. 6C depicts the noise signal 630 in the time domain, at 622; and in the frequency domain, at 624 (full frequency range). FIG. 6D depicts the noise signal 630 in the time domain, at 632; and in the frequency domain, at 634 (0 to 4 kHz range).

The audio processing module 210 determines whether the noise signal 630 is correlated with the generated audio signal 508, at 314. Specifically, the audio processing module 210 determines whether the noise signal 630 is correlated with the generated audio signal 508 to facilitate determining if the noise signal 630 shares a same pattern or rhythm as the generated audio signal 508. Furthermore, the audio processing module 210 can determine whether a normalized noise signal is correlated with the normalized recorded audio signal 620. For example, when there is a speaker-induced vibration of the information handling system 202, such vibrations (noise signal 630) can be presented as harmonic frequencies of the generated audio signal 508. When the frequencies corresponding to the generated audio signal 508 are filtered from the normalized recorded audio signal 620, the remaining noise signal 630 are the frequencies specific to the speaker-induced vibration of the information handling system 202 (unexpected noisy sound-rattle).

Further, as the generated audio signal includes a first audio portion 502 that includes amplitude attenuation and a second audio portion 504 that also includes amplitude attenuation; and the generated audio signal 508 repeats the combined audio portion 506 (the first audio portion 502 and the second audio portion 504) multiple times (e.g., three times), when there is speaker-induced vibration of the information handling system 202, the noise signal 630 can exhibit a similar diminishing amplitude overtime in each sequence aligned with the sequence of the generated audio signal 508 (that is, the noise signal 630 will adhere to the generated audio signal 508).

The audio processing module 210 can determine the correlation between the noise signal 630 and the generated audio signal 508. Specifically, the audio processing module 210 can utilize one or more distinct metrics to determine a correlation between the noise signal and the generated audio signal 508. A first correlation metric can include a cross-correlation and Pearson correlation coefficient. Specifically, the audio processing module 210 utilizes cross correlation for finding patterns that may exist between the noise signal 630 and the generated audio signal 508, regardless of any time shift between the noise signal 630 and the generated audio signal 508. The audio processing module 210 can utilize the Pearson correlation coefficient in measuring a linear relationship between the noise signal 630 and the generated audio signal 508. The audio processing module 210 can utilize the cross-correlation and Pearson correlation coefficient in determining if the noise signal 630 has any similarity in pattern or rhythm to the recorded audio signal 508.

The audio processing module 210 can utilize a second correlation metric in comparing amplitude peaks between the noise signal 630 and the generated audio signal 508. Specifically, the generated audio signal 508 includes a first audio portion 502 that includes amplitude attenuation and a second audio portion 504 that also includes amplitude attenuation; and the generated audio signal 508 repeats the combined audio portion 506 (the first audio portion 502 and the second audio portion 504) multiple times (e.g., three times)—exhibiting a recurring "up and down" amplitude pattern. The audio processing module 210 can smooth both the noise signal 630 and the generated audio signal 508 to determine the number of amplitude peaks, respectively. When there is speaker-induced vibration of the information handling system 202, the audio processing module 210 can determine that the noise signal 630 can exhibit similar amplitude variations and, consequently, the same number of peaks as the generated audio signal 508.

The audio processing module 210 can utilize a third correlation metric in determining the area under the curve. Specifically, the audio processing module 210 can utilize the area under the curve in mitigating false positives. This provides a more comprehensive view of the correlation between the noise signal 630 and the generated audio signal 508 and can further facilitate distinguishing genuine correlations between the two from chance occurrences or noise.

To that end, when the audio processing module 210 incorporates all of the correlation metrics, reliability is enhanced and false positives are reduced.

In some examples, the audio processing module 210 can determine that the noise signal 630 is correlated with the generated audio signal 508 (at 314). Specifically, the audio processing module 210 determines that a normalized noise signal is correlated with the normalized audio signal 620. FIG. 7A illustrates the normalized noise signal 702 and the normalized audio signal 620. In the illustrated example, correlations 720 are shown between the normalized noise signal 702 and the normalized audio signal 620.

The audio processing module 210, in response to determining that the noise signal 630 is correlated with the generated audio signal 508, determines whether a ratio of an amplitude of the noise signal 630 to an amplitude of the normalized recorded audio signal 620 is above a threshold, at 316. Specifically, the audio processing module 210 can leverage the amplitude comparison between the noise signal 630 and the normalized audio signal 620 for precise sound isolation and resilient detection of external noise-such as noise from speaker-induced vibration of the information handling system 202.

Specifically, the audio processing module 210 calculates a mean of the absolute amplitude values for the noise signal 630 (NSA). The audio processing module 210 further calculates a mean of the absolute amplitude values for the normalized recorded audio signal 620 (RSA). The audio processing module 210 then determines a ratio of the mean of the absolute amplitude values for the noise signal 630 to the mean of the absolute amplitude values for the normalized recorded audio signal 620 (NSA/RSA). The audio processing module 210 then determines a score based on such ratio (the score is proportional to the ratio). To that end, the higher the score of the amplitude comparison, the higher the overall score for detection of the speaker induced vibration of the information handling system 202. In some examples, the audio processing module 210 determines that the ratio of the amplitude of the noise signal 630 to the amplitude of the normalized recorded audio signal 620 is above the threshold (at 316). FIG. 7B illustrates the noise signal 630 and the normalized audio signal 620. In the illustrated example, the mean 750 of the absolute amplitude values for the normalized recorded audio signal 620 is shown; and the mean 752 mean of the absolute amplitude values for the noise signal 630.

The audio processing module 210, in response to determining that the ratio of the amplitude of the noise signal 630 to the amplitude of the normalized recorded audio signal 620 is above the threshold, detects a speaker-induced vibration of the information handling system 202, at 318. That is, the audio processing module 210 determines that the speakers 212 are creating the speaker induced vibration of the information handling system 202, and further, that the speakers 212 are introducing the noise signal at the information handling system 202.

In some examples, when the audio processing module 210 detects the speaker induced vibration of the information handling system 202, the audio processing module 210 provides a notification at the information handling system 202 indicating the speaker induced vibration. For example, the notification can include a visual indicator provided on a display of information handling system 202 or an audible notification provided at the speakers 212. For example, the notification can include a notification provided to a user or manager of the information handling system 202 via an external computing device.

In some examples, the audio processing module 210 can determine that the noise signal 630 is not correlated with the generated audio signal 508 (at 314). The audio processing module 210, in response to determining that the noise signal 630 is not correlated with the generated audio signal 508, does not detect a speaker-induced vibration of the information handling system 202, at 320.

In some examples, the audio processing module 210 can determine that the ratio of the amplitude of the noise signal 630 to the amplitude of the normalized recorded audio signal 620 is not above the threshold. The audio processing module 210, in response to determining that the ratio of the amplitude of the noise signal 630 to the amplitude of the normalized recorded audio signal 620 is not above the threshold, does not detect a speaker-induced vibration of the information handling system 202, at 320.

Figure 8:
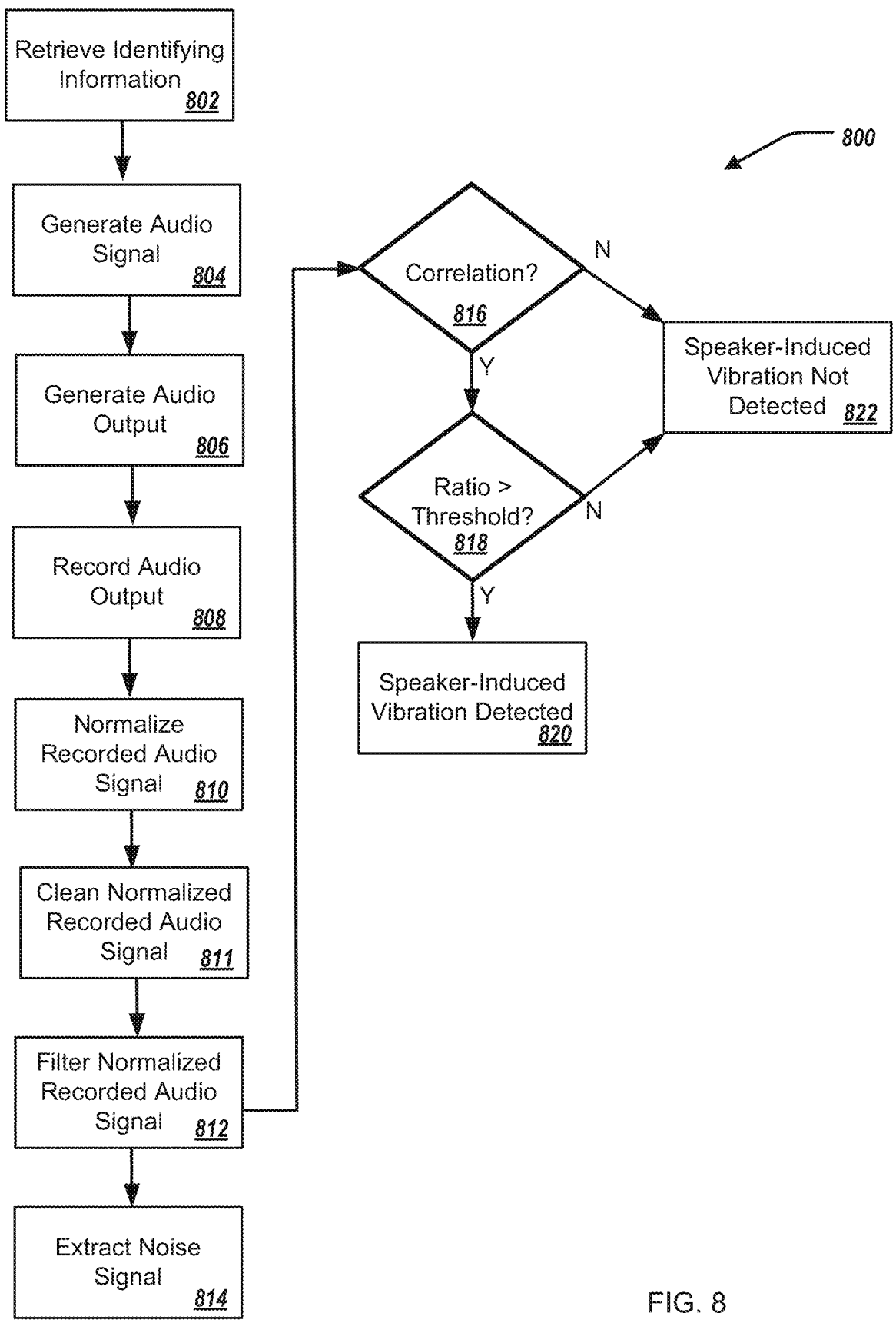
FIG. 8 illustrates a method for managing speaker-induced vibration of the information handling system, in a second embodiment.

FIG. 8 illustrates a flowchart depicting selected elements of an embodiment of a method 800 for managing speaker-induced vibration of the information handling system 202. The method 800 may be performed by the information handling system 100, the information handling system 202 and/or the audio processing module 210, and with reference to FIGS. 1-2 and 9-10. It is noted that certain operations described in method 800 may be optional or may be rearranged in different embodiments.

In some examples, the information coming system 202 can be in a noisy environment (e.g., multiple information handling systems 202 are performing tests for detection of speaker-induced vibration of the information handling system 202). In some examples the generated audio signal can be based on identifying information specific to the information handling system 202, explained further herein.

The audio processing module 210 can retrieve identifying information of the information handling system 202, at 802. In some examples, the identifying information of the information handling system 202 includes a service tag of the information handling system 202. That is, the audio processing module 210 can fetch the service tag of the information handling system 202. The service tag can include a plurality of symbols (e.g., numbers, letters, symbols, gaps).

The audio processing module 210 can generate the audio signal based on this identifying information, at 804. Specifically, the audio processing module 210 can translate each symbol of the plurality of symbols into a corresponding audio portion. The audio processing module 210 can further combine the audio portions that correspond to each of the symbols of the service tag to generate the audio signal.

For example, the audio processing module 210 can convert the symbols of the service tag into Morse code. Each symbol of the service tag can correspond to a specific audio portion (duration and frequency). For example, when the audio processing module 210 coverts the symbols of the service tag into Morse code, Morse code includes dots, dashes, gaps between the dots/dashes (inter-element gaps), and gaps between characters (or words) of the service tag (characters). For example, for a dot, the corresponding audio portion can include a sine wave of a first duration T1 (e.g., 0.2 seconds); a first frequency range F1 (e.g., combination of low-range frequencies 20 Hz to 200 Hz and mid-range frequencies: 200 Hz to 1 KHz); and a first amplitude A1 (e.g., any positive number). For example, for a dash, the corresponding audio portion can include a sine wave of a second duration T2 (e.g., 0.4 seconds); a second frequency range F2 (e.g., combination of low-range frequencies 20 Hz to 200 Hz and mid-range frequencies: 200 Hz to 1 KHz) different than the first frequency range F1; and a second amplitude A2 (e.g., any positive number) different from the first amplitude A1. For example, for a gap between dots/dashes (inter-elemental gap), the corresponding audio portion can have a third duration T3 (e.g., 0.1 seconds); and an amplitude of zero. For example, for a gap between characters, the corresponding audio portion can have a fourth duration T4 (e.g., 0.3 seconds); and an amplitude of zero.

Figure 9:
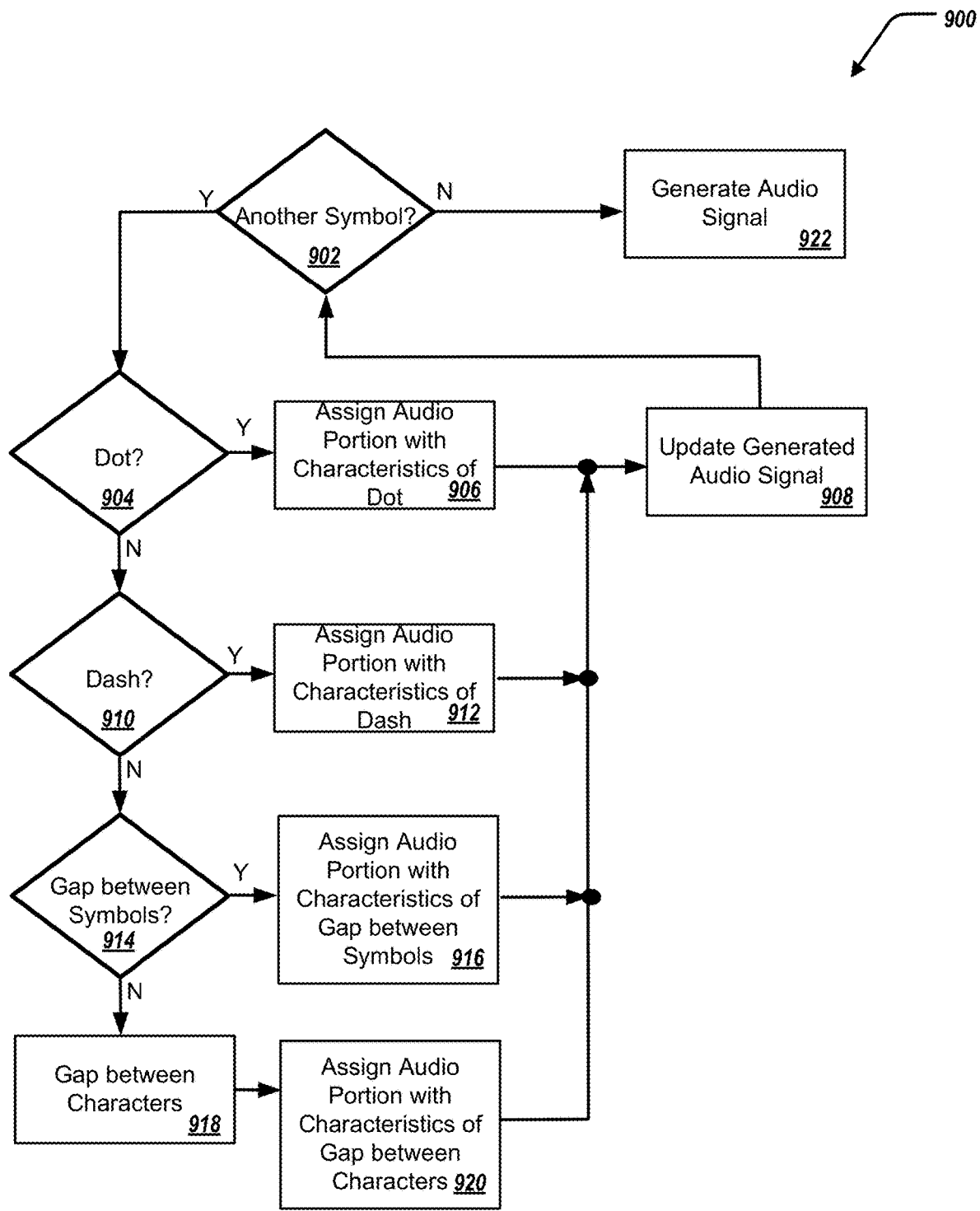
FIG. 9 illustrates a method for generating an audio signal, in the second embodiment.

FIG. 9 illustrates a flowchart depicting selected elements of generating the audio signal, in a second implementation. Specifically, the audio processing module 210 obtains a symbol of the service tag, at 902. The audio processing module 210 can determine whether the symbol is a dot, at 904. If the audio processing module 210 determines that the symbol is a dot, the audio processing module 210 assigns a corresponding audio portion to the symbol that has characteristics associated with a dot (e.g., time duration T1, frequency range F1, and amplitude A1), at 906. The audio processing module 210 updates the generated audio signal to include the corresponding audio portion that correspond to the dot, at 908. The audio processing module 210 returns to 902 to obtain the next symbol of the service tag at 902.

If the audio processing module 210 determines that the symbol is a not a dot, the audio processing module 210 determines whether the symbol is a dash, at 910. If the audio processing module 210 determines that the symbol is a dash, the audio processing module 210 assigns a corresponding audio portion to the symbol that has characteristics associated with a dash (e.g., time duration T2, frequency range F2, and amplitude A2), at 912. The audio processing module 210 updates the generated audio signal to include the corresponding audio portion that correspond to the dash, at 908. The audio processing module 210 returns to 902 to obtain the next character of the service tag at 902.

If the audio processing module 210 determines that the symbol is a not a dash, the audio processing module 210 determines whether the symbol is a gap between symbols, at 914. If the audio processing module 210 determines that the symbol is gap between symbols, the audio processing module 210 assigns a corresponding audio portion to the gap between symbols that has characteristics associated with a gap between symbols (e.g., time duration T3, zero amplitude), at 916. The audio processing module 210 updates the generated audio signal to include the corresponding audio portion that corresponds to the gap between symbols, at 908. The audio processing module 210 returns to 902 to obtain the next symbol of the service tag at 902.

If the audio processing module 210 determines that the symbol is a not a gap between symbols, the audio processing module 210 determines that the symbol is a gap between characters (words), at 918. If the audio processing module 210 determines that the symbol is gap between characters, the audio processing module 210 assigns a corresponding audio portion to the gap between characters that has characteristics associated with a gap between characters (e.g., time duration T4, zero amplitude), at 920. The audio processing module 210 updates the generated audio signal to include the corresponding audio portion that correspond to the gap between characters (words), at 908. The audio processing module 210 returns to 902 to obtain the next symbol of the service tag at 902.

When there are no further symbols, the audio processing module 210 generates the audio signal, at 922.

Returning back to FIG. 8, the audio processing module 210 can generate, based on the generated audio signal, an audio output at the speakers 212, at 806. These speakers 212 can "play" the generated audio signal—i.e., generate sound that is reflective of the generated audio signal. The microphone 214 can record the audio output of the speakers 212, at 808. Specifically, the microphone 214 can record all sounds proximate to the microphone 214, including any environmental sounds and sounds generated by these speakers 212. The microphone 214 can record the audio output of the speakers 212 to define a recorded audio signal. The microphone 214 can record the audio output of the speakers 212 to define the recorded audio signal concurrently with these speakers 212 outputting the generated audio signal. That is, the microphone 214 can record the audio output of the speakers 212 concurrently, or substantially concurrently, or simultaneously, or substantially simultaneously, with the speakers 212 outputting the generated audio signal (the speakers 212 "playing" the audio signal).

The audio processing module 210 normalizes the recorded audio signal, at 810. Specifically, the audio processing module 210 normalizes the recorded audio signal to define a normalized recorded audio signal. The audio processing module 210 normalizes the recorded audio signal by scaling the amplitude of the recorded audio signal to a standard level—e.g., such that it is within the range of −1 to 1.

Figure 10:
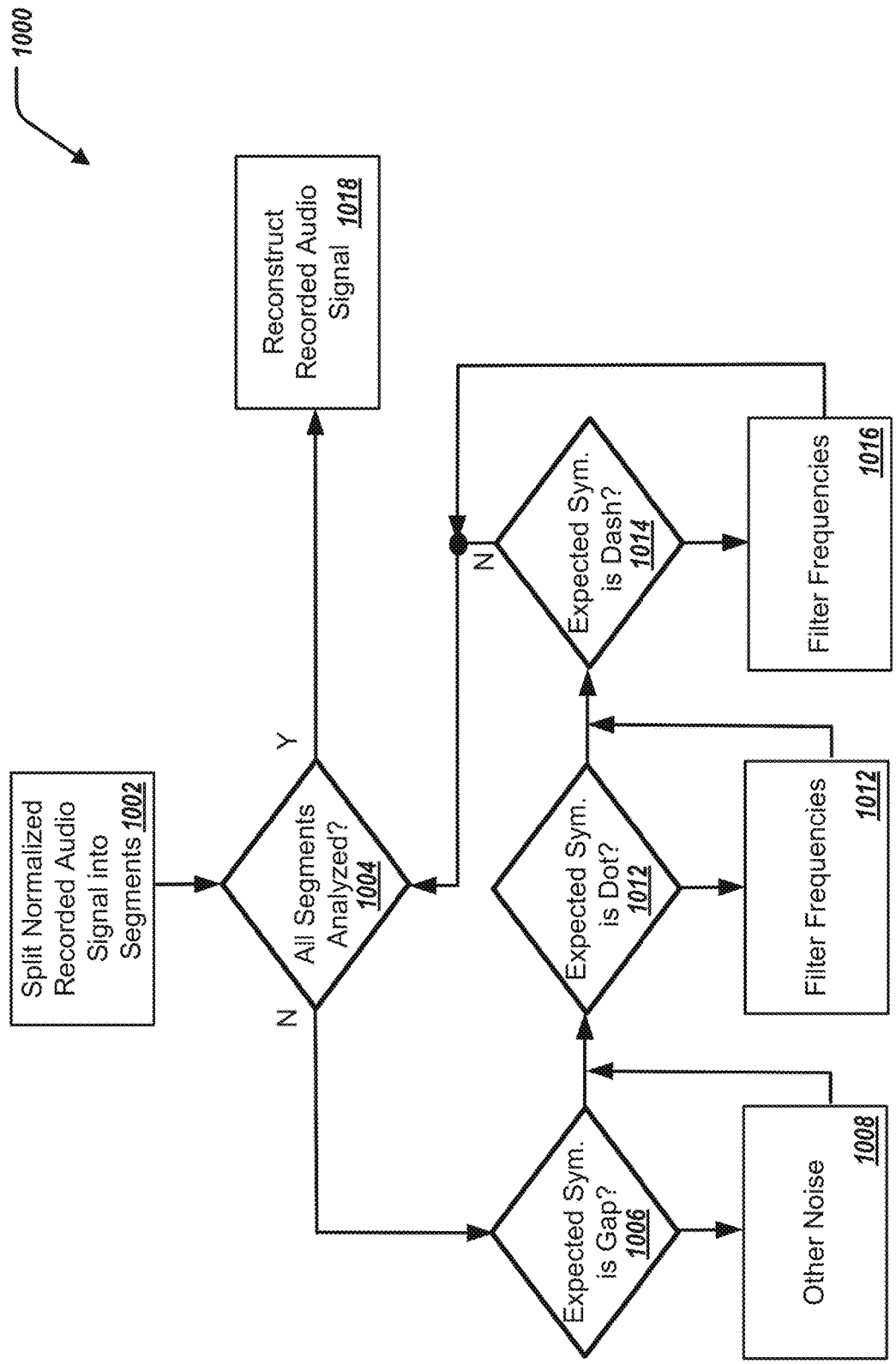
FIG. 10 illustrates a method for cleaning the recorded audio signal, in the second embodiment.

The audio processing module 210 cleans the normalized recorded audio signal, at 811. FIG. 10 illustrates a flowchart depicting selected elements of cleaning the normalized recorded audio signal. Specifically, the audio processing module 210 splits the normalized recorded audio signal into segments, at 1002. Specifically, the audio processing module 210 splits the normalized recorded audio signal into segments, with each segment representing a symbol—dot, dash, gap between symbols, gap between characters (words). The audio processing module 210 then determines whether all segments have been analyzed, at 1004. If the audio processing module 210 determines that not all segments have analyzed, the audio processing module 210 determines whether the expected symbol represents a gap (between characters or between symbols), at 1006. Specifically, the audio processing module 210 determines whether the segment has an amplitude of zero (indicating an absence of sound) or whether the segment has a non-zero amplitude (indicating sound). If the audio processing module 210 determines that the segment has a non-zero amplitude and the expected symbol is a gap, the audio processing module 210 determines potential surrounding environmental noise or interference from other systems during testing, at 1008. Further, the audio processing module 210 removes the sound from the segment by making the amplitude of the segment zero (and further removing noise).

If the audio processing module 210 determines that the expected symbol is not a gap, the audio processing module 210 determines whether the expected symbol represents a dot, at 1010. Specifically, the audio processing module 210 determines whether the segment has a frequency range and amplitude as expected (e.g., F1 and A1) or also has frequencies corresponding to a dash. If the audio processing module 210 determines that the segment has frequency range and amplitude as expected and also frequencies corresponding to a dash, the audio processing module 210 filters frequencies corresponding to the dash (e.g., F2 and A2) out, at 1012. That is, the presence of frequencies corresponding to the dash may imply other systems conducting similar tests at the same time.

If the audio processing module 210 determines that the expected symbol is not a dot, the audio processing module 210 determines whether the expected symbol represents a dash, at 1014. Specifically, the audio processing module 210 determines whether the segment has a frequency range and amplitude as expected (e.g., F2 and A2) or also has frequencies corresponding to a dot. If the audio processing module 210 determines that the segment has frequency range and amplitude as expected and also frequencies corresponding to a dot, the audio processing module 210 filters frequencies corresponding to the dot (e.g., F1 and Aa) out, at 1016. That is, the presence of frequencies corresponding to the dot may imply other systems conducting similar tests at the same time.

After 1008, the method proceeds to 1010. After 1012, the method process to 1014. After 1016, the method proceeds to 1004.

When all segments have been analyzed (at 1004), the audio processing module 210 reconstructs the recorded audio signal, at 1018. Specifically, the audio processing module 210 reconstructs the recorded audio signal by merging all of the altered and unaltered segments.

Returning back to FIG. 8, the audio processing module 210 filters the normalized recorded audio signal, at 812. Specifically, the audio processing module 210 filters the normalized recorded audio signal to remove frequencies corresponding to the generated audio signal to define a filtered normalized recorded audio signal. For example, the audio processing module 210 filters frequencies up to 1 kHz that correspond to frequencies of the generated audio signal.

The audio processing module 210 extracts, based on the filtering, a noise signal from the filtered normalized recorded audio signal, at 814. Specifically, the audio processing module 210 extracts the noise signal from the normalized recorded audio signal by filtering the frequencies that correspond to the generated audio signal.

The audio processing module 210 determines whether the noise signal is correlated with the generated audio signal, at 816. Specifically, the audio processing module 210 determines whether the noise signal is correlated with the generated audio signal to facilitate determining if the noise signal shares a same pattern or rhythm as the generated audio signal. Furthermore, the audio processing module 210 can determine whether a normalized noise signal is correlated with the normalized recorded audio signal. For example, when there is a speaker-induced vibration of the information handling system 202, such vibrations (noise signal) can be presented as harmonic frequencies of the generated audio signal. When the frequencies corresponding to the generated audio signal are filtered from the normalized recorded audio signal, the remaining noise signal are the frequencies specific to the speaker-induced vibration of the information handling system 202 (unexpected noisy sound-rattle).

The audio processing module 210 can determine the correlation between the noise signal and the generated audio signal. Specifically, the audio processing module 210 can utilize one or more distinct metrics to determine a correlation between the noise signal and the generated audio signal. A first correlation metric can include a cross-correlation and Pearson correlation coefficient. Specifically, the audio processing module 210 utilizes cross correlation for finding patterns that may exist between the noise signal in the generated audio signal, regardless of any time shift between the noise signal and the generated audio signal. The audio processing module 210 can utilize the Pearson correlation coefficient in measuring a linear relationship between the noise signal and the generated audio signal. The audio processing module 210 can utilize the cross-correlation and Pearson correlation coefficient in determining if the noise signal has any similarity in pattern or rhythm to the recorded audio signal.

The audio processing module 210 can utilize a second correlation metric in comparing amplitude peaks between the noise signal and the generated audio signal. The audio processing module 210 can smooth both the noise signal and the generated audio signal to determine the number of amplitude peaks, respectively. When there is speaker-induced vibration of the information handling system 202, the audio processing module 210 can determine that the noise signal can exhibit similar amplitude variations and, consequently, the same number of peaks as the generated audio signal.

The audio processing module 210 can utilize a third correlation metric in determining the area under the curve. Specifically, the audio processing module 210 can utilize the area under the curve in mitigating false positives. This provides a more comprehensive view of the correlation between the noise signal and the generated audio signal and can further facilitate distinguishing genuine correlations between the two from chance occurrences or noise.

In some examples, the audio processing module 210 can determine that the noise signal is correlated with the generated audio signal (at 816). Specifically, the audio processing module 210 determines that a normalized noise signal is correlated with the normalized audio signal.

The audio processing module 210, in response to determining that the noise signal is correlated with the generated audio signal, determines whether a ratio of an amplitude of the noise signal to an amplitude of the normalized recorded audio signal is above a threshold, at 818. Specifically, the audio processing module 210 can leverage the amplitude comparison between the noise signal and the normalized audio signal for precise sound isolation and resilient detection of external noise-such as noise from speaker-induced vibration of the information handling system 202.

Specifically, the audio processing module 210 calculates a mean of the absolute amplitude values for the noise signal (NSA). The audio processing module 210 further calculates a mean of the absolute amplitude values for the normalized recorded audio signal (RSA). The audio processing module 210 then determines a ratio of the mean of the absolute amplitude values for the noise signal to the mean of the absolute amplitude values for the normalized recorded audio signal (NSA/RSA). The audio processing module 210 then determines a score based on such ratio (the score is proportional to the ratio). To that end, the higher the score of the amplitude comparison, the higher the overall score for detection of the speaker induced vibration of the information handling system 202. In some examples, the audio processing module 210 determines that the ratio of the amplitude of the noise signal to the amplitude of the normalized recorded audio signal is above the threshold (at 818).

The audio processing module 210, in response to determining that the ratio of the amplitude of the noise signal to the amplitude of the normalized recorded audio signal is above the threshold, detects a speaker-induced vibration of the information handling system 202, at 820. That is, the audio processing module 210 determines that the speakers 212 are creating the speaker induced vibration of the information handling system 202, and further, that the speakers 212 are introducing the noise signal with the information handling system 202.

In some examples, with the audio processing module 210 detects the speaker induced vibration of the information analysis 202, the audio processing module 210 provides a notification at the information handling system 202 indicating the speaker induced vibration. For example, the notification can include a visual indicator provided on a display of information handling system 202 or audible notification provided at the speakers 212. For example, the notification can include a notification provided to a user or manager of the information handling system 202 at an external computing device.

In some examples, the audio processing module 210 can determine that the noise signal is not correlated with the generated audio signal (at 816). The audio processing module 210, in response to determining that the noise signal is not correlated with the generated audio signal, does not detect a speaker-induced vibration of the information handling system 202, at 822.

In some examples, the audio processing module 210 can determine that the ratio of the amplitude of the noise signal to the amplitude of the normalized recorded audio signal is not above the threshold. The audio processing module 210, in response to determining that the ratio of the amplitude of the noise signal to the amplitude of the normalized recorded audio signal is not above the threshold, does not detect a speaker-induced vibration of the information handling system 202, at 822.

In some examples, the management of the speaker-induced vibration of the information handling system 202 can be performed by an integrated BIOS diagnostics or POC approach. In some examples, the management of the speaker-induced vibration of the information handling system 202 can be implemented via a standalone application, e.g., on a USB drive.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing speaker-induced vibration of an information handling system, the method comprising:
    generating an audio signal;
    generating, based on the audio signal, an audio output at speakers of the information handling system;
    recording, by a microphone of the information handling system and concurrently with generating the audio output at the speakers, the audio output of the speakers to define a recorded audio signal;
    normalizing the recorded audio signal to define a normalized recorded audio signal;
    filtering the normalized recorded audio signal to remove frequencies corresponding to the generated audio signal to define a filtered normalized recorded audio signal;

extracting, based on the filtering, a noise signal from the filtered normalized recorded audio signal;

determining that the noise signal is correlated with the generated audio signal;

in response to determining that the noise signal is correlated with the generated audio signal, determining that a ratio of an amplitude of the noise signal to an amplitude of the normalized recorded audio signal is above a threshold; and in response to determining that the ratio of the amplitude of the noise signal to the amplitude of the normalized recorded audio signal is above the threshold, detecting a speaker-induced vibration of the information handling system.

2. The computer-implemented method of claim 1, further including, in response to detecting the speaker-induced vibration of the information handling system, providing a notification at the information handling system indicating the speaker-induced vibration.

3. The computer-implemented method of claim 1, wherein generating the audio signal further includes:

generating a first audio portion, the first audio portion including i) frequencies of a first range and ii) amplitude attenuation over a time period of the first audio portion;

generating a second audio portion, the second audio portion including i) frequencies of a second range greater than the first range and ii) amplitude attention over a time period of the second audio portion;

combining the first audio portion and the second audio portion sequentially to defined a combined audio portion; and repeating the combined audio portion two or more times to define the generated audio signal.

4. The computer-implemented method of claim 1, further including:

retrieving identifying information of the information handling system; and generating the audio signal based on the identifying information.

5. The computer-implemented method of claim 4, wherein the identifying information of the information handling system includes a service tag of the information handling system.

6. The computer-implemented method of claim 5, wherein the service tag includes a plurality of symbols, where each symbol of the plurality of symbols is translated into a corresponding audio portion.

7. The computer-implemented method of claim 6, further including:

combining the corresponding audio portions to generate the audio signal.

8. An information handling system comprising a processor having access to memory media storing instructions executable by the processor to perform operations, comprising:

generating an audio signal;

generating, based on the audio signal, an audio output at speakers of the information handling system;

recording, by a microphone of the information handling system and concurrently with generating the audio output at the speakers, the audio output of the speakers to define a recorded audio signal;

normalizing the recorded audio signal to define a normalized recorded audio signal;

filtering the normalized recorded audio signal to remove frequencies corresponding to the generated audio signal to define a filtered normalized recorded audio signal;

extracting, based on the filtering, a noise signal from the filtered normalized recorded audio signal;

determining that the noise signal is correlated with the generated audio signal;

in response to determining that the noise signal is correlated with the generated audio signal, determining that a ratio of an amplitude of the noise signal to an amplitude of the normalized recorded audio signal is above a threshold; and in response to determining that the ratio of the amplitude of the noise signal to the amplitude of the normalized recorded audio signal is above the threshold, detecting a speaker-induced vibration of the information handling system.

9. The information handling system of claim 8, the operations further including, in response to detecting the speaker-induced vibration of the information handling system, providing a notification at the information handling system indicating the speaker-induced vibration.

10. The information handling system of claim 8, wherein generating the audio signal further includes:

generating a first audio portion, the first audio portion including i) frequencies of a first range and ii) amplitude attenuation over a time period of the first audio portion;

generating a second audio portion, the second audio portion including i) frequencies of a second range greater than the first range and ii) amplitude attention over a time period of the second audio portion;

combining the first audio portion and the second audio portion sequentially to defined a combined audio portion; and repeating the combined audio portion two or more times to define the generated audio signal.

11. The information handling system of claim 8, the operations further including:

retrieving identifying information of the information handling system; and generating the audio signal based on the identifying information.

12. The information handling system of claim 11, wherein the identifying information of the information handling system includes a service tag of the information handling system.

13. The information handling system of claim 12, wherein the service tag includes a plurality of symbols, where each symbol of the plurality of symbols is translated into a corresponding audio portion.

14. The information handling system of claim 13, the operations further including:

combining the corresponding audio portions to generate the audio signal.

15. A non-transitory computer-readable medium storing software comprising instructions executable by one or more computers which, upon such execution, cause the one or more computers to perform operations comprising:

generating an audio signal;

generating, based on the audio signal, an audio output at speakers of the information handling system;

recording, by a microphone of the information handling system and concurrently with generating the audio output at the speakers, the audio output of the speakers to define a recorded audio signal;

normalizing the recorded audio signal to define a normalized recorded audio signal;

filtering the normalized recorded audio signal to remove frequencies corresponding to the generated audio signal to define a filtered normalized recorded audio signal;

extracting, based on the filtering, a noise signal from the filtered normalized recorded audio signal;

determining that the noise signal is correlated with the generated audio signal;

in response to determining that the noise signal is correlated with the generated audio signal, determining that a ratio of an amplitude of the noise signal to an amplitude of the normalized recorded audio signal is above a threshold; and in response to determining that the ratio of the amplitude of the noise signal to the amplitude of the normalized recorded audio signal is above the threshold, detecting a speaker-induced vibration of the information handling system.

16. The non-transitory computer-readable medium of claim 15, the operations further including, in response to detecting the speaker-induced vibration of the information handling system, providing a notification at the information handling system indicating the speaker-induced vibration.

17. The non-transitory computer-readable medium of claim 15, wherein generating the audio signal further includes:

generating a first audio portion, the first audio portion including i) frequencies of a first range and ii) amplitude attenuation over a time period of the first audio portion;

generating a second audio portion, the second audio portion including i) frequencies of a second range greater than the first range and ii) amplitude attention over a time period of the second audio portion;

combining the first audio portion and the second audio portion sequentially to defined a combined audio portion; and repeating the combined audio portion two or more times to define the generated audio signal.

18. The non-transitory computer-readable medium of claim 15, the operations further including:

retrieving identifying information of the information handling system; and generating the audio signal based on the identifying information.

19. The non-transitory computer-readable medium of claim 18, wherein the identifying information of the information handling system includes a service tag of the information handling system.

20. The non-transitory computer-readable medium of claim 19, wherein the service tag includes a plurality of symbols, where each symbol of the plurality of symbols is translated into a corresponding audio portion.

* * * * *